United States Patent [19]

Böhme

[11] 4,395,634
[45] Jul. 26, 1983

[54] RADIOMETRIC METHODS AND MEANS

[75] Inventor: Rolf C. Böhme, Kyalami, South Africa

[73] Assignee: General Mining Union Corporation Limited

[21] Appl. No.: 211,919

[22] Filed: Dec. 1, 1980

[30] Foreign Application Priority Data

Dec. 21, 1979 [ZA] South Africa ........................ 79/6989

[51] Int. Cl.³ ........................ G01N 23/00; G01V 5/00; G01T 1/20
[52] U.S. Cl. ................................ 250/359.1; 250/255; 250/367
[58] Field of Search .................... 250/328, 358 R, 359, 250/361 R, 363 R, 367, 253, 255; 350/96.19, 286

[56] References Cited

U.S. PATENT DOCUMENTS 3,717,402  2/1973  Brewer et al. ........................ 350/286
3,944,832  3/1976  Kalish ................................ 250/367
3,982,128  9/1976  Groch et al. ........................ 250/367
4,029,961  6/1977  Lohr et al. ........................ 250/328
4,291,228  9/1981  Thompson ........................ 250/367

OTHER PUBLICATIONS

Faulkner et al., "Blood Flow Monitor for Heart Monitoring", RCA Technical Note No. 1281, Oct. 1981.

Primary Examiner—Alfred E. Smith
Assistant Examiner—Janice A. Howell
Attorney, Agent, or Firm—Stevens, Davis, Miller & Mosher

[57] ABSTRACT

Apparatus for measuring the radio-active emission from a particle including a housing, a plurality of elongated scintillation crystal radiation detectors in the housing with their axes parallel to each other to define between them a passage for the particle to be measured, an elongated photomultiplier attached to each detector with its axis parallel to that of the detector, light transmitting means joining the multipliers to their detectors and means for connecting electronic measuring means to the multipliers.

10 Claims, 3 Drawing Figures

U.S. Patent     Jul. 26, 1983     4,395,634
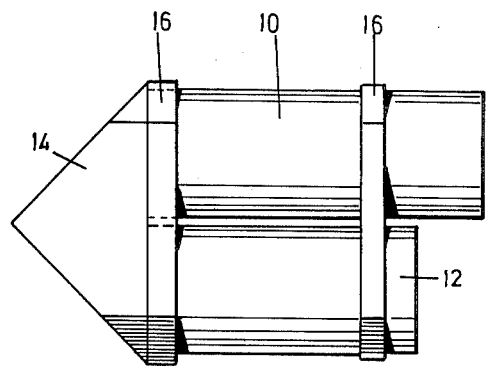
FIG_1
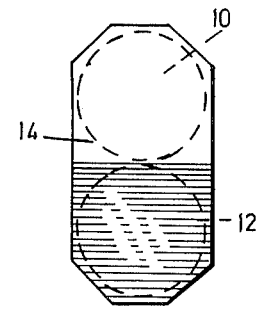
FIG_2
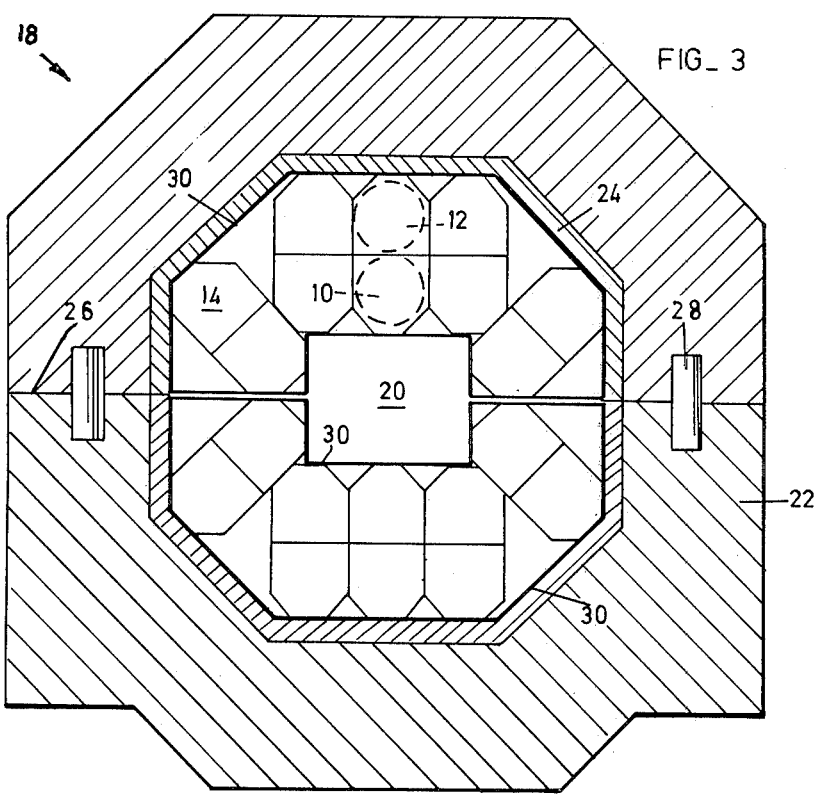
FIG_3

RADIOMETRIC METHODS AND MEANS

FIELD OF THE INVENTION

This invention relates to the measurement of radiation emitted by particles, such as particles of mineral ore, and to means for accomplishing the measurements.

BACKGROUND OF THE INVENTION

Conventionally the radiation emitted by a radioactive source such as a particle of mineral ore is measured by a crystal detector which has a flat receptor surface adjacent to which the particle is placed or past which it is moved while being measured for radioactivity. A difficulty with this system of radiation measurement is that the radiation emissions from a particle are in all directions from the source of radiation in the particle with the radiation in the various directions being of varying intensities due to varying degrees of radiation absorption by the material of the irregularly shaped particle. With this above system of measurement, errors may and in fact do occur in practice by the particle being oriented towards the detector in the direction in which it is least radio emissive.

A further complication with the above measuring system is that the detector must measure the radio-active count of the particle against a background of natural cosmic and other radiation. This is a serious difficulty when measuring the radio-active count of ores, such as those mined in South African gold mines, which are poorly emissive as opposed to uranium ore and in fact have emission levels very close to the background count.

SUMMARY OF THE INVENTION

Apparatus for measuring the radio-active emission from a particle according to the invention includes a housing, a plurality of elongated scintillation crystal radiation detectors in the housing with their axis parallel to each other to define between them a passage for the particle to be measured, an elongated photomultiplier attached to each detector with its axis parallel to that of the detector, light transmitting means joining the multipliers to their detectors and means for connecting electronic measuring means to the multipliers.

Preferably the light transmitting means is an optical prism which is attached to the detector and multiplier and adapted to transmit light emissions from the detector to the multiplier.

In one form of the invention the housing is a lead tunnel and its inner wall is conveniently lined with a radio-actively purer lead than that from which the tunnel is made or alternatively is lined by a metal which has a lower atomic number than that of lead.

A detector for detecting radio-active emissions from material according to the invention includes an elongated scintillation crystal detector, an elongated photomultiplier means holding the multiplier to the detector with its axis parallel to that of the detector and light transmitting means connecting the multiplier to the detector.

Conveniently the light transmitting means is an optical prism which is adapted to transmit light emissions from the detector to the multiplier.

The directional radiation intensity problem could to a degree be solved by locating four crystal detectors as disclosed in U.S. Pat. No. 3,052,353 to Pritchett around the particle to be measured. This arrangement is, however, only capable of measuring emissions in a narrow plane about the particle and is capable of detecting radiation in only axial directions of the detectors. Crystal detectors are elongated and include photomultipliers which are connected to them in an axial relationship further to increase their length. The length of the crystals makes them very difficult to arrange in the Pritchett configuration and extremely expensive to shield in the bulky shield arrangement that would be required.

OBJECT OF THE INVENTION

It is the object of this invention to provide a method and means for measuring the radio-active emissions from particles and to provide a detector which will minimize the above problem.

BRIEF DESCRIPTION OF THE DRAWINGS

The invention is now described by way of example with reference to the drawings in which:

FIG. 1 is a side elevation of the detector of the invention;

FIG. 2 is an end view of the detector of FIG. 1, and

FIG. 3 is a sectional end view of the radiation measuring station of the invention.

DETAILED DESCRIPTION OF THE DRAWINGS

The detector of the invention is shown in FIGS. 1 and 2 to include a crystal scintillation detector 10, a photomultiplier 12 and an optical prism 14.

The detector and multiplier are held in a parallel relationship by two holed frame members 16 which as seen in FIG. 2 are octagonal in shape.

The prism is a right angle clear plastic prism which is attached to the crystal 10 and photomultiplier so that light emissions from the crystal are internally reflected by the surfaces of the prism onto the photomultiplier. The prism is, in front elevation, complementally shaped to the frame members 16.

The measuring station of the invention is shown in FIG. 3 to consist essentially of a housing 18 in which a plurality of the detectors of FIGS. 1 and 2 are arranged about a central passage 20.

The housing 18 consists of a heavy shield 22 which is made from commercially available lead. Because lead of this type is itself inherently radio-active, the housing is lined by a material 24 which is radio-actively purer than commercial lead to minimize background radiation which would otherwise be detected by the detectors. Examples of suitable materials for the liner are purer lead than that of the housing or any suitable metal having a lower atomic number than lead such as radioactively uncontaminated copper or cadmium.

The inherent radio-activity of lead together with cosmic radiation will vary from place to place on the earth's surface and commercially available lead in Johannesburg, South Africa registers as many as nine counts per second. The substantially more expensive low contamination lead at the same place read 4 counts per second or less.

The ends of the housing other than the passage 20 are closed by the lead shield and its liner.

The housing and its liner are split at 26 to facilitate location of the detectors in the housing with the two halves of the housing being held together against relative transverse movement by pins 28 which are located in the housing material on one side of the split and fit into sockets in the material on the other side of the split.

The detectors are located in the housing in the configuration shown in FIG. 3 in two substantially U shaped aluminium housings 30 which are separable on a line in register with the split 26. As is seen from the drawing the purpose of the hexagonal shape of the prisms 14 and frame members 16 is to obtain maximum space utilization around the passage so as to leave as little space as possible between the crystal detectors 10.

The electrical connections between a computer adapted to sum the signals from the photomultipliers and the multipliers are not illustrated as they form no part of the invention and are, in any event well known in the art.

The measuring station of the invention finds particular application in radiometric analysis of ores, sample particles of which are placed singly in the passage 20 and measured for a predetermined period of time. In this application the open ended passage is closed by lead doors which are lined in the same manner as the housing to minimize background radiation. The station could, however, find use as a radiation measuring station in an ore sorting machine, in which case the sorter conveyor would pass through the passage 20. Alternatively, the housing could be arranged so that the axis of the passage is vertically orientated and ore particles or fine particulate material to be measured and sorted in dependence or radio-active content could be dropped or fed under gravity through the passage.

I claim:

1. Apparatus for measuring the radio-active emission from a particle including a housing, a plurality of elongated scintillation crystal radiation detectors in the housing with their axes parallel to each other to define between them a passage for the particle to be measured with the passage extending in a direction which is parallel to the axes of the detectors, an elongated photomultiplier attached to each detector with its axis parallel to that of the detector, light transmitting means joining the multipliers to their detectors and means for connecting electronic measuring means to the multipliers.

2. Apparatus as claimed in claim 1 in which the light transmitting means comprises a plurality of optical prisms respectively associated with each photomultiplier and detector, with each prism being attached to the detector and multiplier and adapted to transmit light emissions from the detector to the multiplier.

3. Apparatus as claimed in claim 2 in which each prism is wider than the cross-sectional dimension of the detector and its multiplier and is octagonal in shape in a direction transverse to the axes of the detector and multiplier.

4. Apparatus as claimed in claim 3 in which the prisms of the detectors which define the passage abut each other.

5. Apparatus as claimed in claim 1 in which the housing is a lead tunnel.

6. Apparatus as claimed in claim 5 in which the lead wall on the inside of the housing is lined with a liner which is made from a lead which has a lower level of radio-active emission than the lead of the tunnel.

7. Apparatus as claimed in claim 5 in which the lead wall on the inside of the housing is lined with a metal having a lower atomic number than lead.

8. Apparatus as claimed in claim 7 in which the detectors, their multipliers and prisms are held in position in the housing between two concentric aluminium sleeves with the radially inner sleeve providing a liner for the passage through the housing.

9. A detector for detecting radio-active emissions from material carrying radio-active products including, an elongated scintillation crystal detector, an elongated photomultiplier, means holding the multiplier to the detector with its axis parallel to that of the detector and light transmitting means connecting the multiplier to the detector.

10. A detector as claimed in claim 9 in which the light transmitting means is an optical prism which is adapted to transmit light emissions from the detector the the multiplier.

* * * * *